Oct. 2, 1928.
H. BLECK
ANIMAL TRAP
Filed July 19, 1926 2 Sheets-Sheet 2
1,686,432
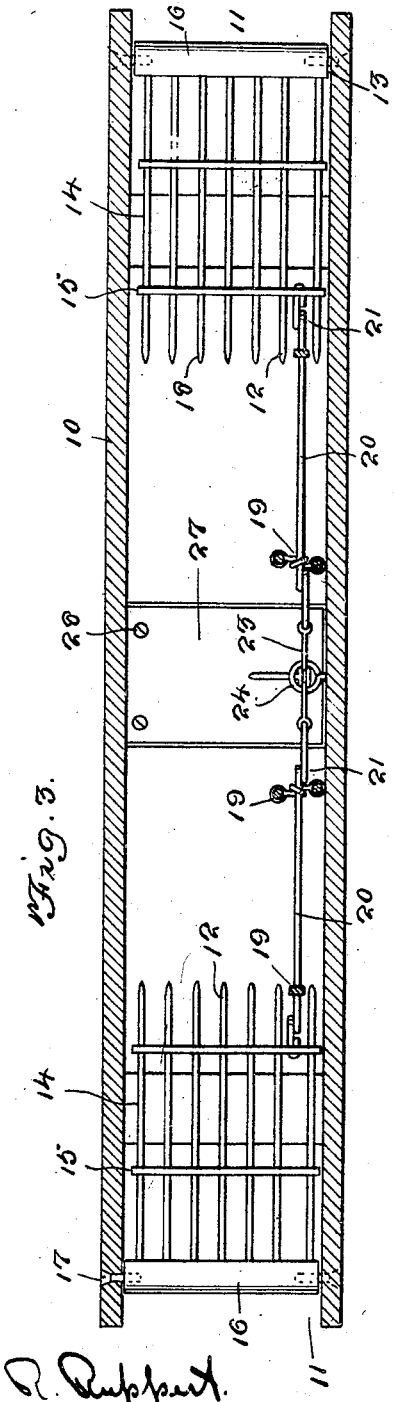
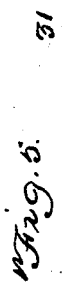
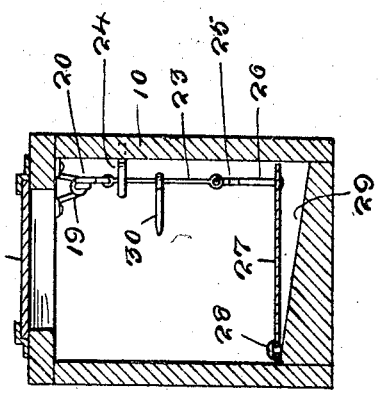
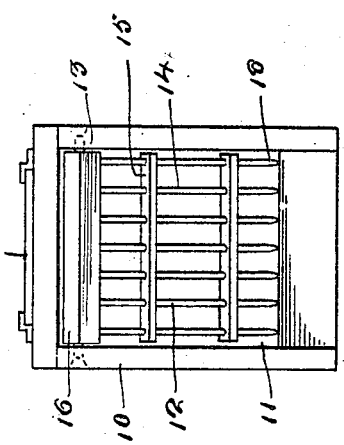

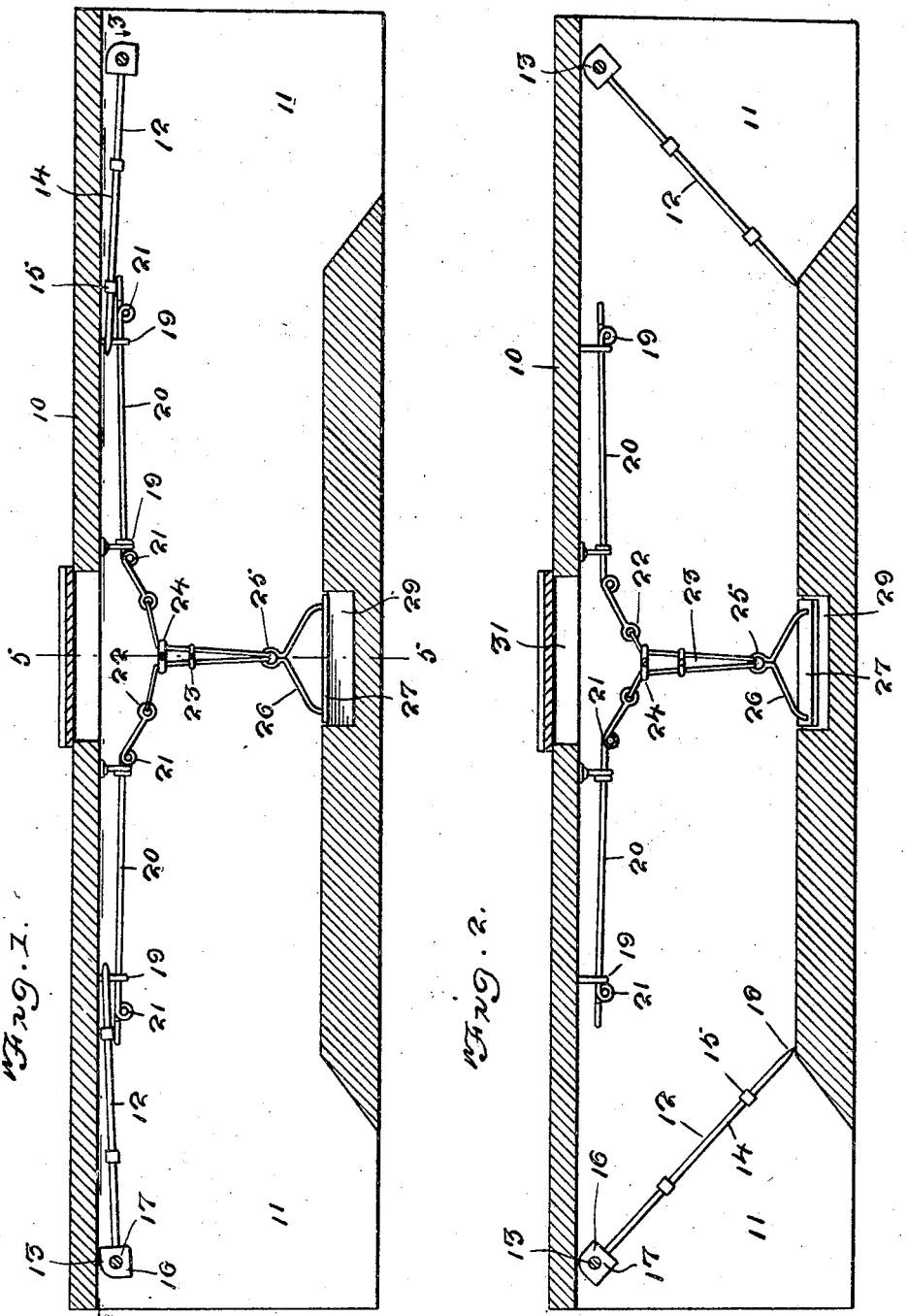

Patented Oct. 2, 1928.

1,686,432

UNITED STATES PATENT OFFICE.

HERMAN BLECK, OF HAMMOND, INDIANA.

ANIMAL TRAP.

Application filed July 19, 1926. Serial No. 123,521.

This invention relates to animal traps especially designed for catching rats or mice and has for an object the provision of a trap which will be operated by the animal entering the trap to prevent his escape, the invention providing a simple, cheap, efficient and sanitary trap, which will capture animals in a humane manner.

With the above and other objects in view, the invention further includes the following novel features and details of construction, to be hereinafter more fully described, illustrated in the accompanying drawings and pointed out in the appended claims.

In the drawings:—

Figure 1 is a longitudinal sectional view of a trap constructed in accordance with the invention, with the trap set for use.

Figure 2 is a similar view with the trap sprung.

Figure 3 is a sectional view taken substantially on the line 3—3 of Figure 1.

Figure 4 is an end view with the parts in the position shown in Figure 2.

Figure 5 is a transverse section taken substantially on the line 5—5 of Figure 1.

Referring to the drawings in detail wherein like characters of reference denote corresponding parts, the reference character 10 indicates a casing which may be made of any suitable material and of any suitable size. The casing is open at each end to provide entrance openings 11 and each of these openings is designed to be closed by a door 12 which is pivotally mounted as shown at 13.

The doors preferably include rods 14 and spacing bars 15, while the inner ends of these rods are connected by a pivot bar 16, the latter being mounted for free swinging movement upon pivot studs or similar elements 17. The outer or free ends of the rod 14 are sharpened or pointed as shown at 18. When in closed position, the doors 12 will have their lower ends engaged with the bottom of the trap in a preferably inclined position and in a manner to prevent outward swinging movement, while normally the doors are held in raised position as shown in Figure 1 in a manner about to be explained.

Mounted for longitudinal sliding movement in hangers 19 which are carried by the top of the trap casing, are rods 20. The outer ends of these rods are adapted to engage one of the spacing bars 15 of the door so as to hold the latter open. Longitudinal sliding movement of the rods 20 is limited in opposite directions by means of stops 21. The rods are preferably formed of wire and the stops 21 are preferably formed by providing loops in the rods. The inner ends of the rods are formed with eyes 22 and connected to these eyes is the opposite end of a flexible member 23. This member may be formed of suitable material which will resist stretching, for example, a sufficient number of strands of horse hair to provide proper strength. The flexible member 23 passes through a guide 24 and is looped through an eye 25 provided in a bail 26. This bail is connected to a platform or plate 27 adjacent one edge of the latter, while the opposite edge of this platform or plate is secured to the bottom or base of the trap by screws 28. The openings in the plate 27 through which these screws pass is of sufficient size to permit of free pivotal movement of the plate. The bottom or base of the trap casing is cut away on an incline as shown at 29 so as to permit downward movement of one end of the plate. In order to entice the animal into the trap upon the plate 27 there is provided a bait holder 30 which is positioned directly above the plate and is designed to have placed thereon suitable bait so that when the animal in attempting to reach the bait places his weight upon the plate 27, the latter will be depressed so as to release the doors 12 from engagement with the rods 20.

It is of course obvious that one or both of the doors may be set in open position, or the trap may be constructed with only a single door.

A slide closed opening 31 is preferably provided in the top of the trap so that access may be had to the interior for setting the trap and inserting the bait.

The invention is susceptible of various changes in its form, proportions and minor details of construction and the right is herein reserved to make such changes as properly fall within the scope of the appended claims.

Having described the invention what is claimed is:—

1. An animal trap comprising a casing open at one end, a pivotally mounted gravity door for closing the open end of the casing, a substantially straight rod mounted for longitudinal sliding movement within the casing and adapted to engage the underside of the door to hold the latter in open position, a horizontally disposed pivotally mounted plate within the casing and means connecting the plate and rod to hold the plate elevated when the rod is in door engaging position and to disengage the rod from the door when the plate is depressed.

2. An animal trap comprising a casing open at opposite ends, a pivotally mounted gravity door for closing each end of the casing, oppositely disposed substantially straight rods mounted for longitudinal sliding movement within the casing and adapted to engage each of the doors to hold the same in open position, looped hangers for slidably supporting the rods, and stops on the rods for limiting the longitudinal movement thereof, a horizontally disposed pivotally mounted plate within the casing and means connecting the plate and rods to hold the plate elevated when the rods are in downward engaging position and to disengage the rods from the door when the plate is depressed.

3. An animal trap comprising a casing open at each end, a door pivotally mounted at its top at each end of the casing and adapted to swing downward to close said casing, oppositely extending slidably mounted rods arranged within the casing and adapted to have their outer ends engage the doors to hold the latter in open position, a normally horizontally disposed platform mounted at one end for pivotal movement within the casing, and a flexible member connected with the opposite end of the platform and having its opposite ends connected to the inner ends of the rods, whereby depression of the platform will move the rods relatively inward and release the doors.

4. An animal trap comprising a casing, open at its ends, gravity actuated doors for closing said ends, straight rods slidably mounted in said casing each having one end engageable under the respective doors, the opposite ends having downwardly sloping portions connected to the straight portions by loops formed therebetween, members pivoted on one end and having their opposite ends connected with said downwardly sloping portions.

5. An animal trap comprising a casing, open at its ends, gravity actuated doors for closing said ends, straight rods slidably mounted in said casing, each having one end engageable under the respective door, the opposite ends having downwardly sloping portions connected to the straight portions by loops formed therebetween, a member pivoted at one end and flexible members connecting the opposite end of the pivoted member to the ends of said sloping portions.

6. An animal trap comprising a casing, open at its ends, gravity actuated doors for closing said ends, straight rods slidably mounted in said casing, each having one end engageable under the respective door, the opposite ends having downwardly sloping portions connected to the straight portions by loops formed therebetween, members pivoted at one end and flexible members connecting the opposite end of pivoted members to the ends of said sloping portions and a guide for said flexible members.

In testimony whereof I affix my signature.

HERMAN BLECK.